United States Patent [19]
Williames

[11] Patent Number: 6,165,094
[45] Date of Patent: Dec. 26, 2000

[54] VEHICLE POWERTRAINS

[76] Inventor: Geoffrey Allan Williames, Butlers Track, Warragul, Victoria 3820, Australia

[21] Appl. No.: 09/284,448
[22] PCT Filed: Oct. 24, 1997
[86] PCT No.: PCT/AU97/00714
   § 371 Date: May 18, 1999
   § 102(e) Date: May 18, 1999
[87] PCT Pub. No.: WO98/17927
   PCT Pub. Date: Apr. 30, 1998

[30] Foreign Application Priority Data

Oct. 24, 1996 [AU] Australia .................................. PO 3197

[51] Int. Cl.$^7$ .............................. F16H 3/72; F16H 37/08
[52] U.S. Cl. ................................. 475/6; 475/9; 475/221; 475/903; 74/665 M
[58] Field of Search ................................... 475/1, 2, 6, 9, 475/198, 199, 204, 221, 903; 74/665 M

[56] References Cited

U.S. PATENT DOCUMENTS

| | | | |
|---|---|---|---|
| 1,720,018 | 7/1929 | Tubbs | 475/6 |
| 2,196,368 | 4/1940 | Thomson . | |
| 2,366,646 | 1/1945 | Orr | 475/1 |
| 5,902,206 | 5/1999 | Oda et al. | 475/221 |

FOREIGN PATENT DOCUMENTS

| | | |
|---|---|---|
| 48860/93 | 4/1994 | Australia . |
| 532471 | 9/1920 | France . |
| 532471 | 4/1922 | France . |
| 1043512 | 10/1951 | France . |
| 1043512 | 10/1953 | France . |
| 2586773 | 9/1985 | France . |

*Primary Examiner*—Sherry Estremsky
*Attorney, Agent, or Firm*—Welsh & Katz, Ltd.

[57] ABSTRACT

A vehicle power transmission and a vehicle powertrain capable of being continuously controlled over a predetermined range of operation. The powertrain includes two power units, the power transmission unit and a control device for receiving command input and determining performance parameters associated with the operation of the powertrain, an outer transmission and an inner differential gear assembly. The main transmission has two rotatable inputs, each operable connected to one power unit for receiving rotational power and operably connected to a rotatable output so that the rotational speed of the output can vary in proportion to the algebraic mean of the speeds of ratios of the two inputs. The differential gear assembly is arranged internally of the main transmission with a rotatable input operably connected to two differentially rotatable outputs. The output of the main transmission is operably connected to the input of the differential gear assembly. A closed loop feedback control continuously monitors, analyses and adjusts the performance parameters in response to command input, to maintain the efficiency of the power units within peak ranges while simultaneously continuously monitoring and adjusting the load sharing to synergistically control the final output speed and power of the power transmission unit to meet operational requirements.

32 Claims, 8 Drawing Sheets

VEHICLE POWERTRAINS

FIELD OF THE INVENTION

This invention relates to vehicle powertrains.

BACKGROUND ART

Vehicle powertrains generally comprise power unit and power transmission subsystems. Vehicular power transmission subsystems conventionally include a main transmission and an automotive differential gear assembly for differentially driving two drive wheels.

In order to couple power unit efficiency with the variable speed and power demands of a vehicle, a requirement exists for a vehicle powertrain wherein the power unit and the power transmission can be continuously controlled as an integrated unit over the full range of operation so that the performance characteristics of the powertrain can be adaptively and synergistically optimised in response to command inputs from the vehicle driver. A preferred components of such an adaptively controlled vehicle powertrain is a transmission capable of transmitting power at a continuously variable output speed. Such transmissions may be generically described as continuously variable transmissions.

Previously proposed continuously variable transmissions have tended to be complex, unreliable and inefficient at high torque loads. For these and other practical size, weight and cost considerations, previously proposed continuously variable transmissions have typically been ill-suited for use in vehicle powertrains. A requirement accordingly exists for an efficient, compact and reliable continuously variable transmission that is suitable for use is vehicle powertrains.

DISCLOSURE OF THE INVENTION

According to a first aspect of the present invention, there is provided a power transmission unit including an outer main transmission and an inner differential gear assembly, the main transmission having two rotatable input means operably connected to rotatable output means so that the rotational speed of the output means can vary in proportion to the algebraic mean of the speeds of rotation of two input means, the differential gear assembly being arranged internally of the main transmission and having rotatable input means operably connected to two differentially rotatable output means, wherein the output means of the main transmission and the input means of the differential gear assembly are operably connected.

According to a second aspect of the present invention, there is provided a vehicle powertrain capable of being continuously controlled over a predetermined range of operation including:

two power units;

a power transmission unit including an outer main transmission and an inner differential gear assembly;

the main transmission having two rotatable input means each operably connected to a power unit for receiving rotational power, the two input means being operably connected to rotatable output means so that the rotational speed of the output means can vary in proportion to the algebraic mean of the speeds of rotation of two input means;

the differential gear assembly being arranged internally of the main transmission and having rotatable input means operably connected to two differentially rotatable output means, wherein the output means of the main transmission and the input means of the differential gear assembly are operably connected;

control means including means for receiving command input and means for determining performance parameters associated with the operation of the powertrain, wherein the performance parameters include the load on each of the two power units, the rotational speeds of each of the two input means of the main transmission, the load on each of the two output means of the differential gear assembly, and the rotational speeds of each of the two output means of the differential gear assembly;

wherein the control means provides closed loop feedback control to continuously monitor, analyse and adjust the performance parameters in response to command input.

The two power units advantageously comprise any similar or dissimilar combination of any of the range of conventional internal combustion engine types—including the Otto engine, the Diesel engine, the rotary engine or the gas turbine engine—or conventional electric motor types. The Otto and Diesel internal combustion engines are preferred because they represent established technologies with relatively low production costs. Advantageously, the two power units are arranged such that their rotational power output means, such as crankshafts in the case of internal combustion piston engines, are coaxially in end to end relationship. Preferably, the rotational power output means of the two power units both rotate in the same direction with respect to the power transmission unit. Preferably, at least one of the rotational power output means of the two power units is selectively operably connected to an input means of the main transmission of the power transmission unit by clutch means. The operable connection may also include gear, chain, belt, or direct engine drive shaft connection means. The two power units may conveniently be surrounded by a common casing.

The powertrain of this invention permits the power unit configuration to be optimised for different applications. For example a constant speed electric motor can be used as one power unit and an internal combustion engine on the other power unit to provide a low pollution hybrid. In other possible configurations one of the power units can be used to level out peak power demands and/or provide regenerative braking.

The main transmission of the power transmission unit advantageously comprises a gear train. Preferably, the two input means of the main transmission comprise a first bevel gear and an epicyclic gear assembly coaxially arranged to rotate about a first axis. Advantageously, the epicyclic gear assembly comprises an annular pinion carrier that rotatably supports internally arranged epicyclic bevel pinion gears having axes perpendicular to the first axis. Conveniently, the first bevel gear and the annular pinion carrier are each individually operably connectable to rotational power sources, such as the two power units. Preferably, the output means of the main transmission comprises a second bevel gear arranged coaxially with both the first bevel gear and the epicyclic gear assembly to rotate about the first axis. Advantageously, the epicyclic gear assembly is arranged between the first and second bevel gears with the epicyclic bevel pinion gears in mesh with both the first and second bevel gears. The main transmission, as described, comprises a continuously variable transmission wherein the output speed (the speed of rotation of the second bevel gear) will be proportional to the sum or difference of the two input speeds (the speeds of rotation of the first bevel gear and the epicyclic gear assembly).

Preferably, the input means of the differential gear assembly of the power transmission unit comprise differential bevel pinion gears arranged radially inside the main transmission to rotate about axes perpendicular to the first axis. Advantageously, the output means of the differential gear assembly comprise two differential bevel side gears coaxially arranged in mesh with the differential pinion gears to rotate about the first axis.

Preferably, the first and second bevel gears of the main transmission each have a centrally formed and axially extending hole. Preferably, the two differential side gears of the differential gear assembly are centrally mounted on opposed ends of two coaxially aligned power output members, such as half-axles, that extend axially outwards through the holes in the first and second bevel gears of the main transmission and are advantageously operably connectable to drive wheels.

Advantageously, the main transmission is operably connected to the differential gear assembly by a differential frame that is connected to the second bevel gear of the main transmission and which carries the differential pinion gears of the differential gear assembly. The differential gear assembly, as described, has the functionality of a conventional automotive differential gear. This configuration is particularly advantageous for use with power units such as hollow shafted "pancake" type true rotary engines or turbines arranged on either side of the transmission with the outputs exiting through the respective engine to provide an extremely simple, compact and lightweight powertrain.

Where the power units comprise Otto engines or Diesel engines, the power transmission unit is conveniently located centrally beneath the two power units. Where the power units comprise rotary, gas turbine or electric engines, the power transmission unit may conveniently be mounted centrally between the two power units with the power output members extending through the centre of hollow rotor or turbine shafts. Further, the housing of the power transmission unit may be integral with the common casing of the two power units.

Advantageously, an internal combustion engine can be split to provide separate crankshafts that constitute the two power units. A major advantage of this arrangement is that the split engine can utilise many shared auxiliary components.

In some applications a flywheel arrangement can be provided as a means of storing kinetic energy. The flywheel may or may not be associated with one of the power units. The flywheel arrangement can be used to supplement power input in times of peak demand and/or provide for regenerative breaking.

The power transmission unit described above conveniently integrally combines the functionalities of the main transmission and the differential gear assembly such that input rotational power may be differentially transmitted to two rotational power outputs at continuously variable output speeds.

The control means advantageously comprises a microprocessing control unit having an input device for receiving command input, for example from a vehicle driver, and a plurality of input/output interface devices for providing closed loop feedback control of the performance parameters of the vehicle powertrain. The plurality of input/output interface devices advantageously comprise a plurality of high-performance sensors for monitoring, analysing and transmitting data on the performance parameters of the powertrain. Preferably, the performance parameters continuously controlled by the microprocessing control unit further include performance parameters that are specific to the type or types of the power units comprising the vehicle powertrain. For example, where the two power units comprise at least one internal combustion piston engine, the performance parameters continuously controlled by the microprocessing control unit may further include performance parameters that are specific to each internal combustion piston engine such as manifold boost pressure, engine torque, engine RPM, fuel mixture, spark timing, valve timing, variable intake manifold geometry, combustion chamber conditions, compression ratio and exhaust gas chemistry.

In use, the microprocessing control unit advantageously provides closed loop feedback control to continuously monitor, analyse and synergistically adjust the performance parameters in response to command input from the driver. Specifically, the microprocessing control unit advantageously adaptively responds to command input and/or analysis of data on the performance parameters and continuously controls the final output speed and power of the powertrain to meet operational requirements by synergistically adjusting the performance parameters, including the relative speeds of the two power input means and the load sharing between the two power units.

Advantageously, the microprocessing control unit is programmable with a performance algorithm so that it continuously adjusts the controlled performance parameters in accordance with the algorithm to optimise powertrain performance. For example, the microprocessing control unit may be programmed to optimise powertrain efficiency, in which case in response to command input from the vehicle driver the microprocessing control unit would continuously monitor, analyse and synergistically adjust the performance parameters of each of the two power units to maintain the efficiency of the two power units within peak ranges while simultaneously continuously monitoring and adjusting the load sharing between the two power units to synergistically control the final output speed and power of the transmission to meet operational requirements. As such, overall power unit efficiencies may be achieved over a wide range of different operating conditions.

It will be appreciated that where the two power units comprise at least one internal combustion engine type, significant improvements in fuel economy and correspondingly significant reductions in exhaust gas emission may be achieved. It will be further appreciated that in order to optimise the overall power unit efficiencies, the two power units may comprise a combination of dissimilar power unit types, such as a rotary or gas turbine engine and a Diesel engine, or an Otto engine and an electric motor, that each have peak efficiencies during different, but complementary, ranges of the overall range of operating conditions.

Advantageously, a variable displacement combustion chamber and/or pre-combustion chamber is included in internal combustion engine embodiments of the present invention. For the reasons outlines below, the inclusion of a variable displacement combustion chamber and/or pre-combustion chamber allows pertinent performance parameters of the internal combustion engines to be continuously controlled to optimise fuel efficiency and environmental pollution control. Specifically, in an internal combustion engine, the ignited fuel air mixture, burns in a flame front continuing out to the perimeter of the confines of the cylinder. The expanding gases that are generated, push the piston away from the cylinder head, thereby rotating the crankshaft and providing a power stroke. As the piston moves away from the expanding gases, it increases the cylinder volume. The higher the initial cylinder compression ratio the faster the burn rate and corresponding expansion rate and the need for faster piston speed which equates to higher engine RPM. With a fixed compression engine, it is desirable to have the piston speed match the rate at which the gases are expanding for optimum cylinder pressure, resulting in best fuel efficiency and lowest pollution levels. It is the intention of preferred embodiments of this invention, to offer the optimum compression and engine RPM to coincide with energy levels required to maintain the desired vehicle speed. By having the function of a stepless variable speed transmission giving the precise vehicle speed required while maintaining the optimum fuel air burn rate, by varying the engine's RPM input speeds in relation to each other and by varying the compression ratios and fuel air ratios, optimum operating conditions can be maintained in real time across the full spectrum of vehicle speed and energy requirements, giving minimum pollution and maximum fuel efficiency. A further control of the speed of the flame front, particularly related to a diesel engine, is to have a variable displacement pre-combustion chamber. The interaction of inputs and outputs from the microprocessing control unit, allows optimum settings of engine speed, combustion chamber compression ratio and or pre-combustion chamber displacement, to give smooth even fuel air burn speed (flame front), corresponding with the mechanical movement and speed of the restraining members in a piston or rotary engine.

Embodiments of the invention will now be described, by way of example only, with reference to the accompanying drawings.

BEST MODES FOR CARRYING OUT THE INVENTION

Figure 1:
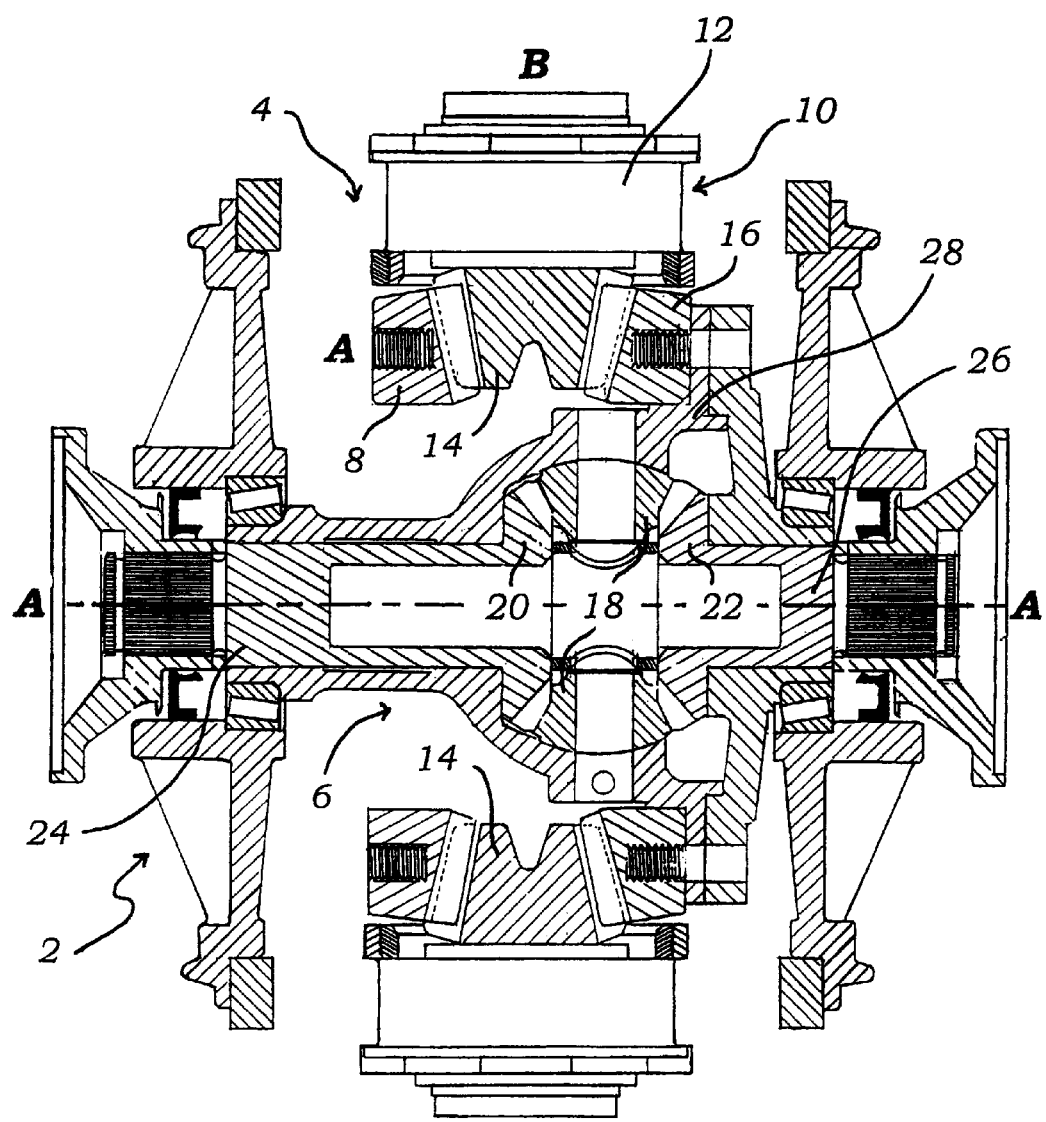
FIG. 1 is a partially cutaway diagrammatic view of an embodiment of a power transmission unit according to the first aspect of the invention.
Figure 2:
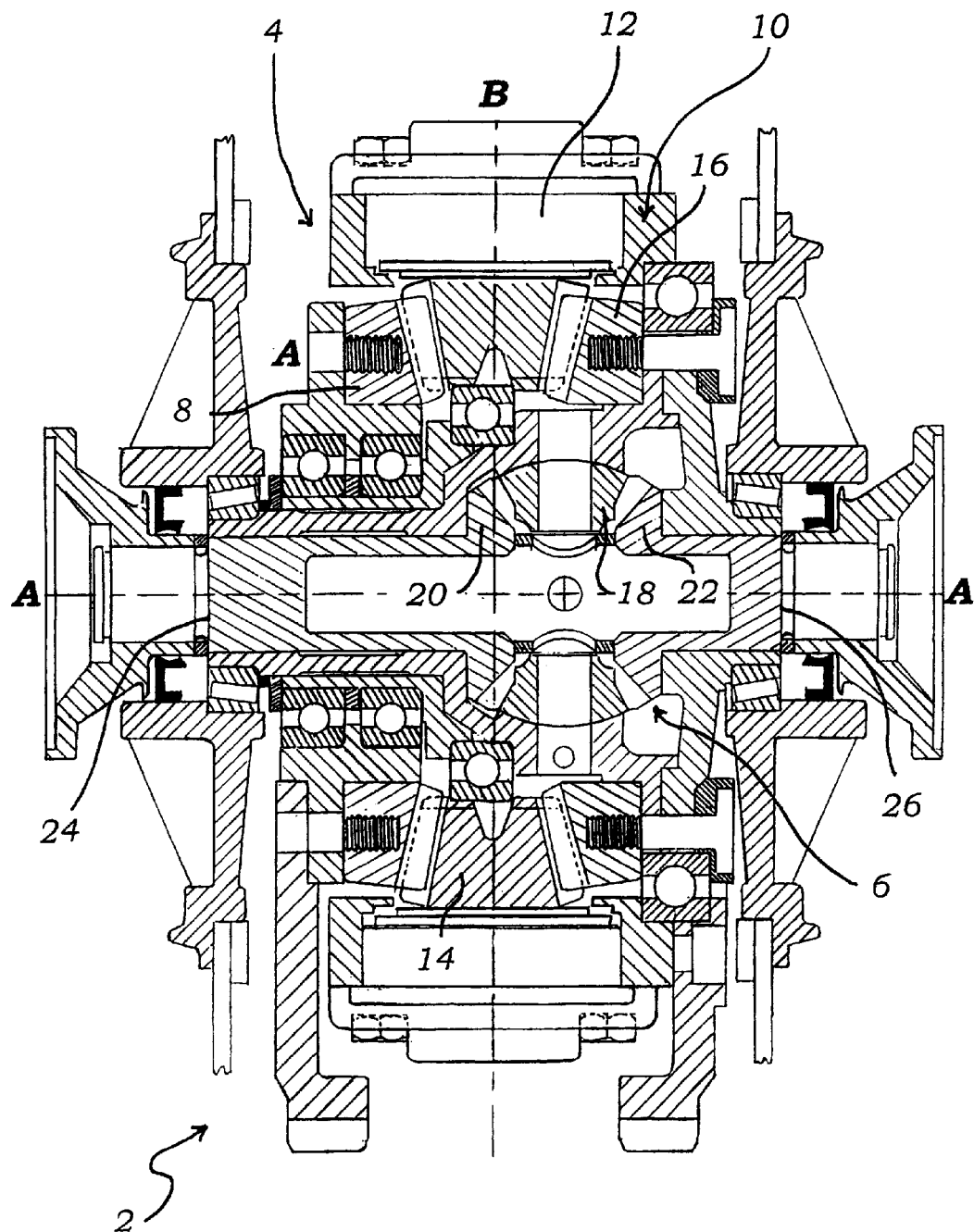
FIG. 2 is a cutaway view of a practical embodiment of the power transmission unit illustrated in FIG. 1.

As shown in the accompanying FIGS. 1 and 2, a power transmission unit 2 in accordance with preferred embodiments of the first aspect of the invention generally comprises an outer main transmission 4 having two rotatable input means operably connected to rotatable output means and an inner differential gear assembly 6 having rotatable input means operably connected to two differentially rotatable output means. These components will now be described in more detail with various preferred embodiments being discussed.

The main transmission 4 of the power transmission unit 2 advantageously comprises a gear train. The two input means of the main transmission 4 comprise a first bevel gear 8 and an epicyclic gear assembly 10 coaxially arranged to rotate about a first axis A—A. The epicyclic gear assembly 10 comprises an annular pinion carrier 12 which rotatably supports internally arranged epicyclic bevel pinion gears 14 having axes perpendicular to the first axis A—A. As indicated by letters A and B in FIG. 1, the first bevel gear 8 and the annular pinion carrier 12 are each individually operably connectable by conventional means, such as gear, belt, chain or direct engine drive shaft connection, to rotational power sources (not shown). The output means of the main transmission 4 comprises a second bevel gear 16 arranged coaxially with both the first bevel gear 8 and the epicyclic gear assembly 10 to rotate about the first axis A—A. The first and second bevel gears 8, 16 of the main transmission 4 each have a centrally formed and axially extending hole. The epicyclic gear assembly 10 is arranged between the first and second bevel gears 8, 16 with the epicyclic bevel pinion gears 14 in mesh with both the first and second bevel gears 8, 16.

The differential gear assembly 6 is arranged internally of the main transmission 4. The input means of the differential gear assembly 6 of the power transmission unit 2 comprise differential bevel pinion gears 18 arranged radially inside the main transmission 4 to rotate about axes perpendicular to the first axis A—A. The output means of the differential gear assembly 6 comprise two differential bevel side gears 20, 22 coaxially arranged in mesh with the differential pinion gears 18 to rotate about the first axis A—A. The two differential side gears 20, 22 are centrally mounted on opposed ends of two coaxially aligned power output members 24, 26 such as half-axles, that extend axially outwards through the holes in the first and second bevel gears 8, 16 of the main transmission 4. The half-axles 24, 26 are operably connectable to drive wheels (not shown).

The main transmission 4 is operably connected to the differential gear assembly 6 by a differential frame 28 that is connected to the second bevel gear 16 of the main transmission 4 and which carries the differential pinion gears 18 of the differential gear assembly 6.

FIG. 2 shows a practical embodiment of the arrangement of FIG. 1 including the bearings, seals and mounting configurations required for an operating assembly. These components can be varied in practice and although their function will be readily appreciated by those skilled in the art a description is not required for an understanding of the invention.

In use, the main transmission 4 described above comprises a continuously variable transmission wherein the output speed (the speed of rotation of the second bevel gear 16) will be proportional to the sum or difference of the two input speeds (the speeds of rotation of the first bevel gear 8 and the epicyclic gear assembly 10). It will thus be appreciated that if the speeds of the first bevel gear 8 and the epicyclic gear assembly 10 are controlled, the speed of the second bevel gear 16 may be varied progressively from a design maximum in a first direction of rotation, through zero, to a design maximum in a second opposite direction of rotation. As also described above, the differential gear assembly 6 operates in the manner of a conventional automotive differential gear. The power transmission unit 2 described above thus conveniently integrally combines the functionalities of the main transmission 4 and the differential gear assembly 6 such that input rotational power may be differentially transmitted to two half-axles 24, 26 at continuously variable output speeds.

The operation of the power transmission unit 2 described above may be further understood with reference to the exemplary embodiment illustrated in FIG. 1 wherein the first bevel gear 8 and the second bevel gear 16 of the main transmission 4 each have thirty teeth, and the epicyclic bevel pinion gears 14 of the main transmission 4 each have ten teeth.

The effect of different ratios of inputs in the same direction of rotation about axis A—A for the exemplary embodiment illustrated in FIG. 1 is described below.

1:1 Ratio of Inputs

If the first bevel gear 8 is turned forward by one turn, thirty teeth of bevel gear 8 have been rotated forward. If at the same time annular pinion carrier 12 has been rotated forward one turn in the same direction about axis A—A each epicyclic bevel pinion gear 14 will have remained stationary. In consequence, the non-rotating bevel pinion gears 14 with gear teeth engaged in the second bevel gear 16 will cause bevel gear 16 and the differential frame 28 to rotate forward one full turn about axis A—A. The differential pinion gears 18 carried by the 15 differential frame 28 are only restrained by differential side gears 20, 22 which are operably connected to half-axles 24, 26 respectively to allow a normal automotive differential action between two drive wheels (not shown).

The result is that, with a ratio of inputs between the first bevel gear 8 and the annular 20 pinion carrier 12 at 1:1, the speed ratio through the power transmission unit 2 and to the differential frame 28 is 1:1.

2:1 Ratio of Inputs

If the bevel gear 8 is rotated forward by one turn, moving forward thirty teeth, and 25 if the annular pinion carrier 12 is rotated in the same direction about axis A—A forward half a turn (2:1), then each epicyclic bevel pinion 14 will have rotated in reverse around axes perpendicular to axis A—A by fifteen teeth and travelled at the point of engagement at the second bevel gear 16 by fifteen teeth for the half turn. As the second bevel gear 16 has thirty teeth and the annular pinion carrier 12 and bevel pinion gears 14 have travelled half a turn, then the thirty toothed second bevel gear 16 and the differential frame 28 remain stationary.

The result is that, with the ratio of inputs between the first bevel gear 8 and the annular pinion carrier 12 at 2:1, the second bevel gear 16 and the differential side gears 20, 22 will remain in an effectively locked stationary position.

3:1 Ratio of Inputs

If the first bevel gear 8 is turned forward one turn by thirty teeth and if the annular pinion carrier 12 is rotated forward in the same direction about axis A—A one third of a turn, then each epicyclic bevel pinion gear 14 will counter-rotate backwards by twenty teeth while travelling the equivalent distance of ten teeth around the second bevel gear 16. Therefore, the second bevel gear 16 and the differential frame 28 will rotate in reverse by ten teeth, or one third in reverse. As described above, the differential gear assembly 6 allows for a normal automotive differential action between two drive wheels (not shown).

The result is that, with the ratio of inputs between the first bevel gear 8 and the annular pinion carrier 12 at 3:1, the second bevel gear 16 and the differential frame 28 will rotate one third of a turn in the reverse direction about axis A—A.

It will be appreciated that overdrive can be obtained by a ratio of inputs less than unity. In view of the above description, it will be appreciated that embodiments of the power transmission unit of the present invention provide a compact, integral combination of a continuously variable transmission with a conventional automotive differential that is suitable for use in vehicle powertrains, particularly, though not exclusively, in vehicle powertrains for front-wheel drive vehicles. In particular, embodiments of the transmission of the present invention enable two vehicle drive wheels to be differentially driven at continuously variable speeds of rotation.

Figure 3:
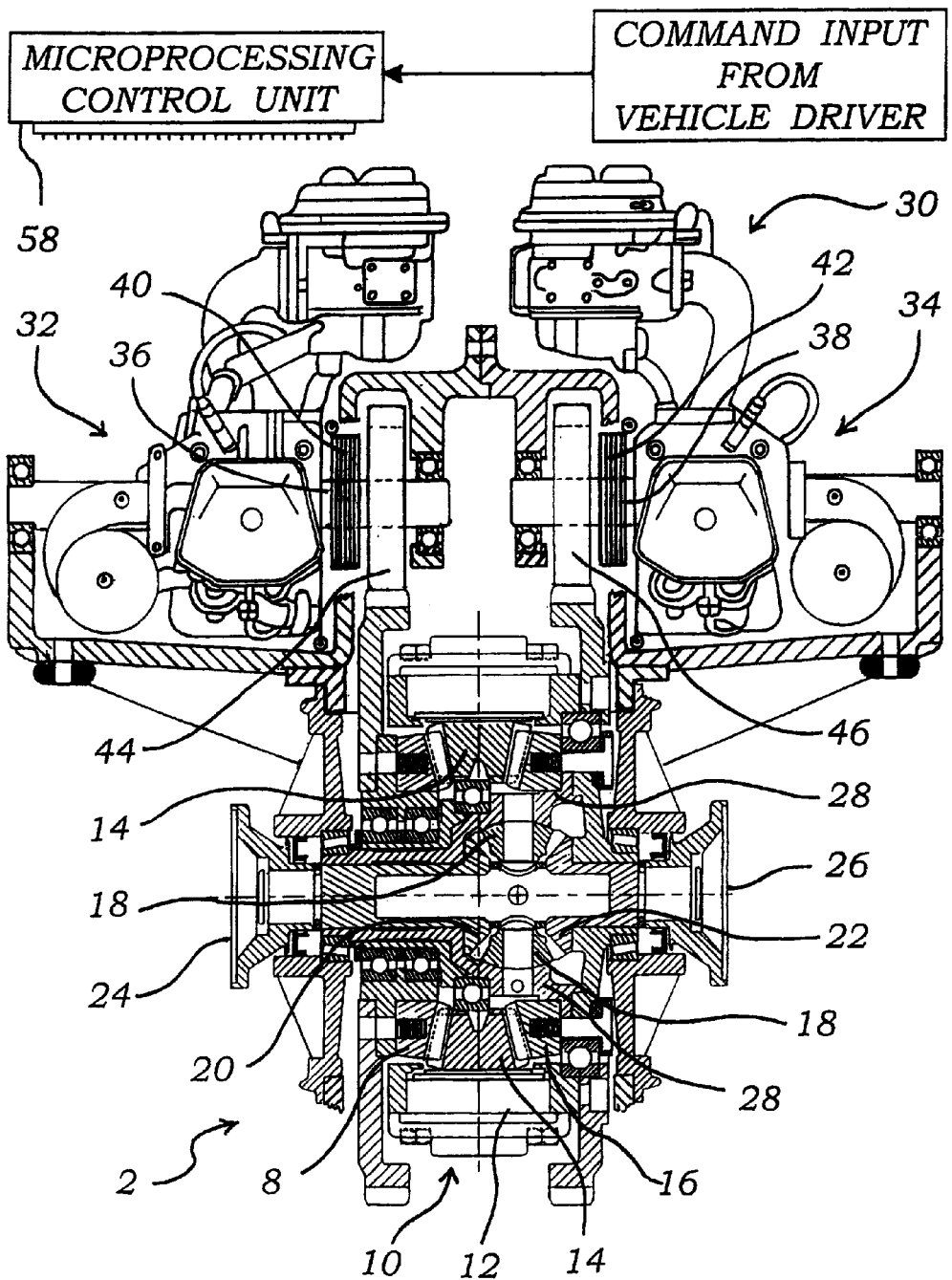
FIG. 3 is a partially sectioned diagrammatic view of an Otto or Diesel engine embodiment of a vehicle powertrain according to the second aspect of the invention.
Figure 4:
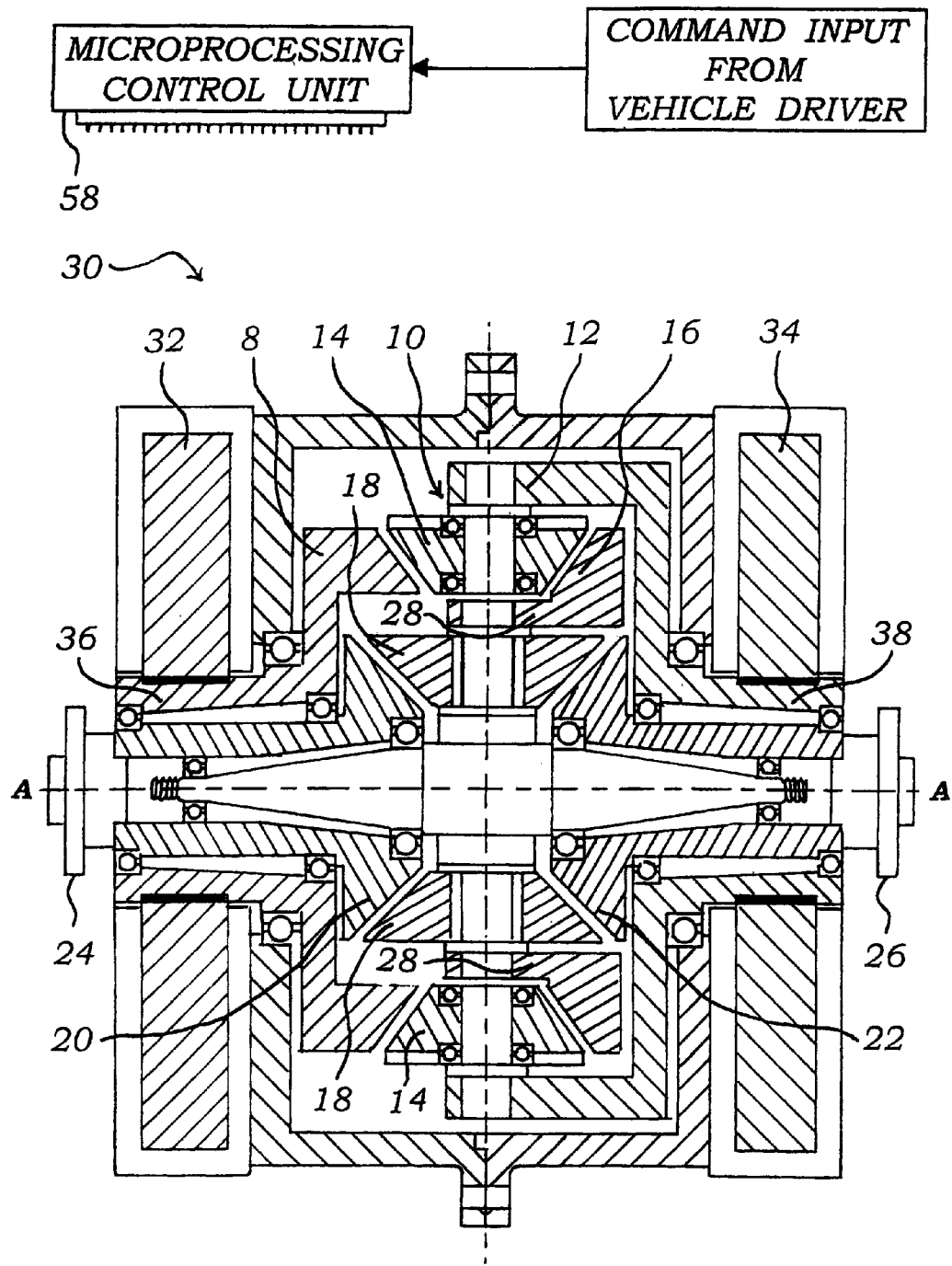
FIG. 4 is a partially sectioned diagrammatic view of a rotary or gas turbine engine embodiment of a vehicle powertrain according to the second aspect of the invention.
Figure 5:
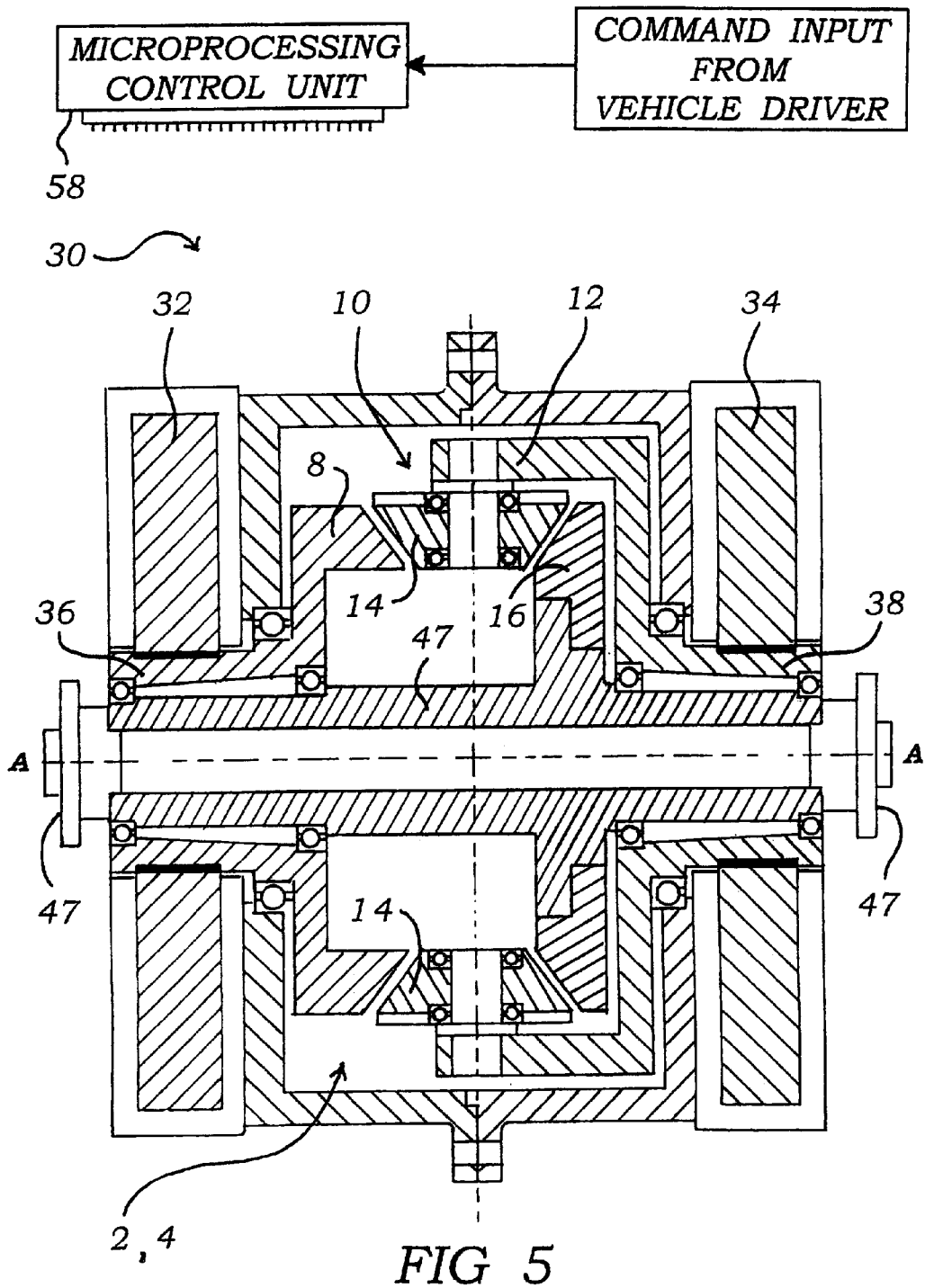
FIG. 5 is a partially sectioned diagrammatic view of a simplified embodiment of the vehicle powertrain illustrated in FIG. 4.

As shown in the accompanying FIGS. 3, 4 and 5, a vehicle powertrain 30 in accordance with the preferred embodiments of the second aspect of the invention generally comprises two power units 32, 34, a power transmission unit 2 and a microprocessing control unit 58. These components will now be described in more detail with various preferred embodiments being discussed.

The foregoing detailed description of the construction, arrangement and operation of the various components of the power transmission unit 2 is incorporated herein by reference.

In the embodiments illustrated in FIGS. 3, 4 and 5, the two power units 32, 34 comprise two internal combustion engines, although the two power units 32, 34 may alternatively comprise any similar or dissimilar combination of any of the range of conventional internal combustion engine types—including the Otto engine, the Diesel engine, the rotary engine or the gas turbine engine—or conventional electric motor types. The Otto and Diesel internal combustion engines are preferred because they represent established technologies with relatively low production costs. In the embodiment illustrated in FIG. 3 the two power units 32, 34 comprise Otto or Diesel engines, while in the embodiments 15 illustrated in FIGS. 4 and 5 the two power units 32, 34 comprise rotary or gas turbine engines. The two power units 32, 34 advantageously share common auxiliaries but remain individually operable and controllable.

In the illustrated embodiments, the two engines 32, 34 each have rotational power output means or shaft 36, 38, for example crankshafts in the case of the embodiment illustrated in FIG. 3. Advantageously, the two engines 32, 34 are arranged such that their power output shafts 36, 38 are individually rotatable and coaxially aligned in end to end relationship. Preferably, the power input shafts 36, 38 of the two engines 32, 34 both rotate in the same direction with respect to the power transmission unit 2 thus dispensing with any requirement for means to reverse the direction of rotation of either or both of the power output shafts 36, 38. Conveniently, the power transmission unit 2 is centrally located beneath (as in the embodiment illustrated in FIG. 3), or centrally between (as in the embodiments illustrated in FIGS. 4 and 5), the two engines 32, 34. In the latter case, the half-axles 24, 26 extend through the centre of hollow rotor or turbine shafts 36, 38 of the rotary or gas turbine engines. At least one of the respective power output shafts 36, 38 of the two engines 32, 34 are individually selectively connectable to the first bevel gear and the annular pinion carrier 12 respectively of the power transmission unit 2 by clutch means. In most applications each output shaft 36, 38 has clutch means 40, 42 and gear, chain or belt drive means 44, 46. The two engines 32, 34 are conveniently surrounded by a common casing. The housing of the power transmission unit 2 is also conveniently integral with the common casing of the two engines 32, 34.

FIG. 5 illustrates a simplified embodiment of the vehicle powertrain 30 illustrated in FIG. 4 wherein the second bevel gear 16 of the power transmission unit 2 is not operably connected to an inner differential gear assembly (that is, the power transmission unit 2 only includes the main transmission 4), but is instead operably connected to a drive shaft 47. The simplified embodiment of the vehicle powertrain 30 illustrated in FIG. 5 advantageously utilises rotary or gas turbine engines and is adapted to used in front and/or rear wheel drive vehicles wherein drive shaft 47 is operably connected to a single conventional automotive differential gear assembly. Alternatively, the vehicle powertrain 30 illustrated in FIG. 5 may be mid-mounted in four wheel drive vehicles wherein the drive shaft 47 is operably connected to forward and rear conventional four wheel drive differential gear assemblies.

Figure 6:
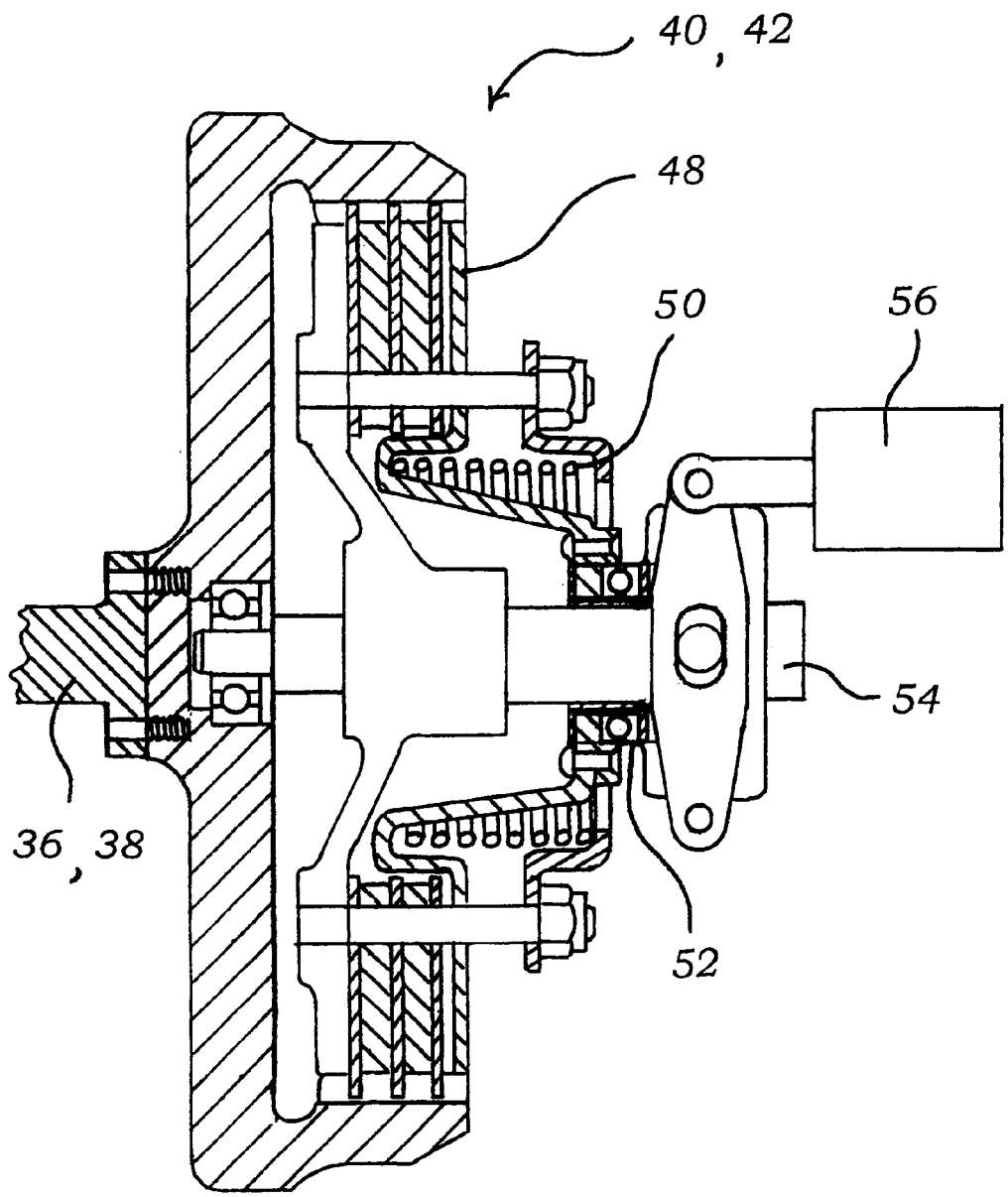
FIG. 6 is a partially sectioned diagrammatic view of a clutch preferred for use in embodiments of the vehicle powertrain according to the second aspect of the invention.

A preferred embodiment of the clutch means 40, 42 utilised in the embodiment illustrated in FIG. 3 is shown in FIG. 6 and comprises a pressure plate or plates 48 engaged by springs 50, with an operative thrust bearing 52 around and free from shaft 54. As described below, a thrust activating servo device 56 is conveniently controlled by the microprocessing control unit 58 to individually selectively connect the respective power output shafts 36, 38 of the two engines 32, 34 to the first bevel gear 8 and the annular pinion carrier 12 respectively of the power transmission unit 2.

The microprocessing control unit 58 includes an input device (not shown) for receiving command input from the vehicle driver and a plurality of input/output interface devices (not shown) for providing closed loop feedback control of the performance parameters of the vehicle powertrain. Preferably, the plurality of input/output interface devices (not shown) comprise a plurality of high-performance sensors for monitoring, analysing and transmitting data on the performance parameters of the powertrain. The performance parameters advantageously include the load on each of the two engines 32, 34, the rotational speeds of each of the two power output shafts 36, 38, the load on each of the two half-axles 24, 26, and the rotational speeds of each of the two half-axles 24, 26. Preferably, the performance parameters continuously controlled by the microprocessing control unit 58 further include performance parameters that are specific to the type or types of the power units comprising the vehicle powertrain.

In use, the microprocessing control unit 58 advantageously provides closed loop feedback control to continuously monitor, analyse and synergistically adjust the performance parameters in response to command input from the driver. During starting of the two engines 32, 34, the microprocessing control unit 58 conveniently controls the individual operation of the two engines 32, 34 and the operation of the clutch means 40, 42 to individually control the connection of the respective power output shafts 36, 38 of the two engines 32, 34 to the first bevel gear 8 and the annular pinion carrier 12 respectively of the power transmission unit 2. That is, at start up the microprocessing control unit 58 only connects the respective power output shaft 36, 38 of the two engines 32, 34 to the first bevel gear 8 and the annular pinion carrier 12 respectively when the ratio of rotational speeds between power output shaft 36 and power output shaft 38 is 2:1. From the foregoing description of the operation of the power transmission unit 2 it will be appreciated that each of the differential side gears 20, 22 of the power transmission unit 2 will thus be positively locked in a safe stationary position at zero speed. It will be apparent that in most applications a manually operated overriding clutch is provided to increase the level of safety. It will also be appreciated from the foregoing description of the operation of the power transmission unit 2 that in response to subsequent command input, for example from a vehicle driver, the microprocessing control unit 58 will conveniently control the operation of the two engines 32, 34 to adjust the relative speeds of the power output shafts 36, 38 so that the differential side gears 20, 22 of the power transmission unit 2, (and hence the two half-axles 24, 26 and the two drive wheels (not shown), rotate in a desired direction, at a desired speed. During operation of the vehicle powertrain 30 the microprocessing control unit 58 adaptively responds to command input and/or analyses of data on the performance parameters and continuously controls the final output speed and power of the vehicle powertrain 30 to meet operational requirements by synergistically adjusting the performance parameters, including the relative speeds of the two engines 32, 34 and the load sharing between the two engines 32, 34.

Advantageously, the microprocessing control unit 58 is programmable with a performance algorithm so that it continuously synergistically adjusts the controlled performance parameters in accordance with the algorithm to optimise vehicle powertrain 30 performance. For example, the microprocessing control unit 58 may be programmed to optimise vehicle powertrain 30 efficiency, in which case in response to command input the microprocessing control unit 58 would continuously monitor, analyse and synergistically adjust the performance parameters of each of the two engines 32, 34 to maintain the efficiency of the two engines 32, 34 within peak ranges while simultaneously continuously monitoring and adjusting the load sharing between the two engines 32, 34 to synergistically control the final output speed and power of the power transmission unit 2 to meet operational requirements. As such, overall engine efficiencies may be achieved over a wide range of different operating conditions. It will thus be appreciated that in embodiments employing internal combustion engines, significant improvements in fuel economy and correspondingly significant reductions in exhaust gas emission may be achieved.

Figure 7:
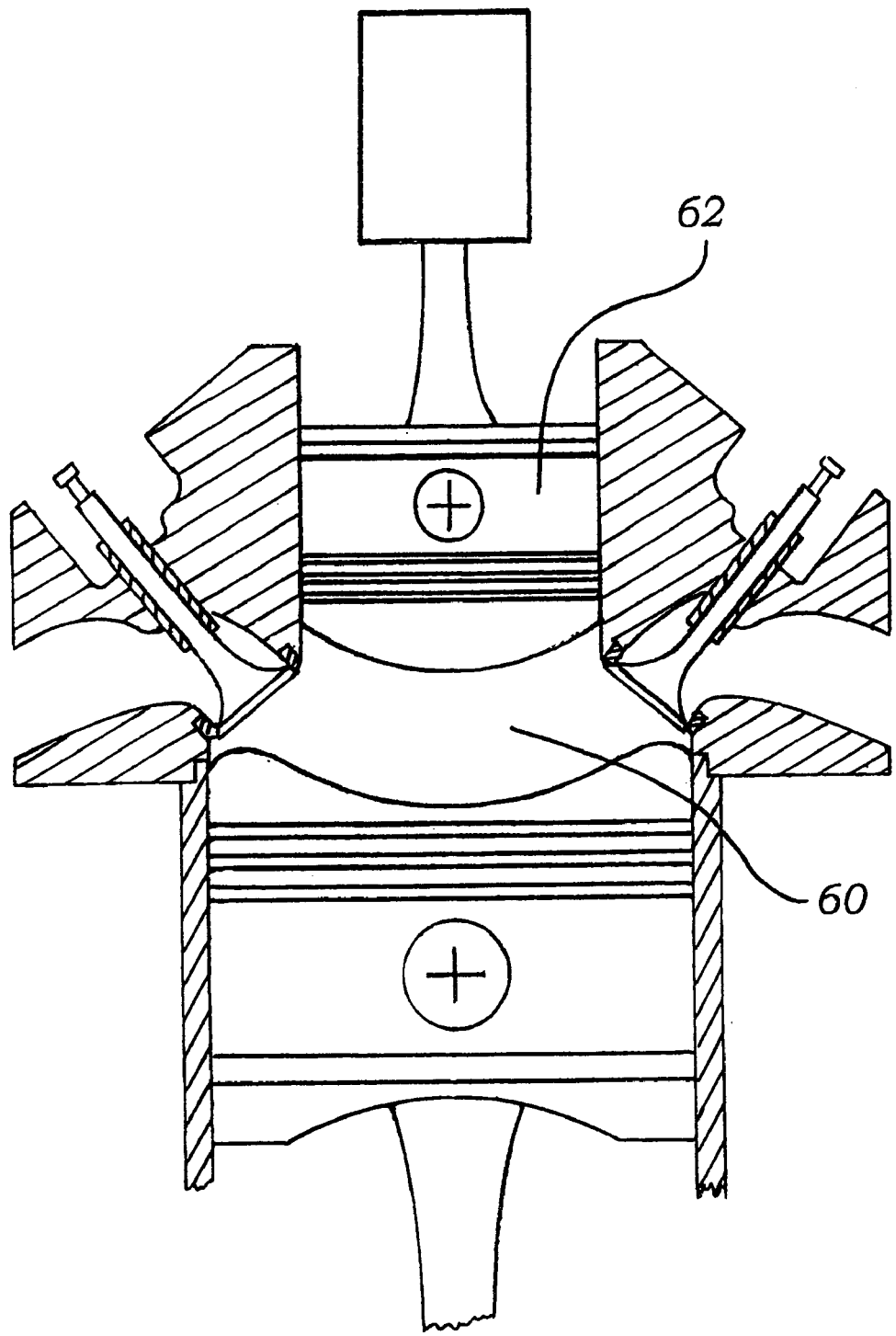
FIG. 7 is a partially sectioned diagrammatic view of a variable displacement combustion chamber for use in the preferred embodiment illustrated in FIG. 3.
Figure 8:
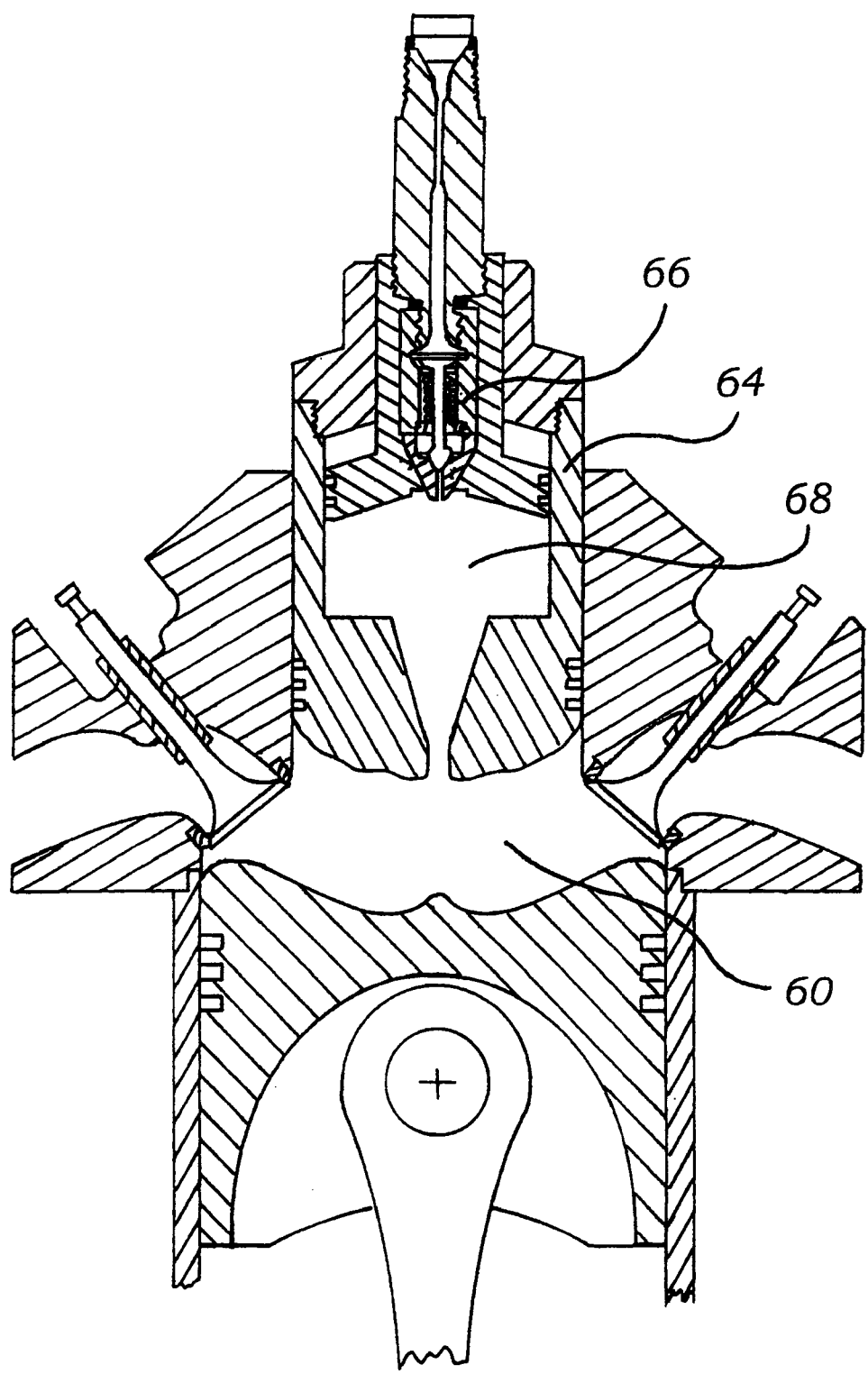
FIG. 8 is a partially sectioned diagrammatic view of a variable displacement combustion chamber and pre-combustion chamber for use in the preferred embodiment illustrated in FIG. 3.

For example, where the two power units 32, 34 comprise internal combustion piston engines (such as in the embodiment illustrated in FIG. 3), the performance parameters continuously controlled by the microprocessing control unit advantageously further include parameters that are specific to each internal combustion piston engine such as manifold boost pressure, engine torque, engine rpm, fuel mixture, spark timing, valve timing, variable intake manifold geometry, combustion chamber conditions, compression ratio and exhaust gas chemistry. FIG. 7 illustrates a practical arrangement whereby the volume of a combustion chamber 60 of an internal combustion piston engine may be varied by means of a moveable second piston element 62. During use, the movement of the second piston element 62 is advantageously continuously controlled by the microprocessing control unit 58 to adaptively optimise the volume of combustion chamber 60 to meet operational requirements. FIG. 8 illustrates a modification of the practical arrangement illustrated in FIG. 7 whereby the volume of a combustion chamber 60 of an internal combustion piston engine may be varied by means of a moveable piston assembly 64 that in turn comprises a moveable injector mechanism 66. During use, the movement of both the piston assembly 64 and the injector mechanism 66 are advantageously continuously controlled by the microprocessing control unit 58 to adaptively optimise both the volume of combustion chamber 60 and the volume of the pre-combustion chamber 68 to meet operational requirements. Specifically, the microprocessing control unit 58 adaptively optimises compression and engine RPM to coincide with energy levels required to maintain the desired vehicle speed. By having the function of a stepless variable speed transmission giving the precise vehicle speed required while maintaining the optimum fuel air burn rate, by varying the two engines' RPM input speeds in relation to each other, and by varying the compression ratios and fuel air ratios, optimum operating conditions can be maintained in real time across the full spectrum of vehicle speed and energy requirements, offering minimum pollution and maximum fuel efficiency. Further operating efficiencies may be attained by continuously controlling the speed of the flame front, particularly in diesel engine embodiments, by means of the variable displacement pre-combustion chamber described above. The interaction of inputs and outputs from the microprocessing control unit 58, allows optimum setting of engine speed, combustion chamber compression ratio and or pre-combustion chamber displacement, to give smooth even fuel air burn speed (flame front), corresponding with the mechanical movement and speed of the restraining members in a piston or rotary engine.

In view of the above description, it will be appreciated that embodiments of the vehicle powertrain of the present invention provide a compact adaptively controlled vehicle powertrain that is particularly suited for weight and size critical applications, such as in small and medium size front-wheel drive vehicles.

While the present invention has been described with particular reference to preferred embodiments, the present invention is susceptible of being embodied with various alterations and modifications which may differ particularly from those that have been described in the preceding specification. These variations and alterations are possible without departing from the scope of the invention.

What is claimed is:

1. A vehicle powertrain capable of being continuously controlled over a predetermined range of operation including:
   two power units;
   a power transmission unit including an outer main transmission and an inner differential gear assembly;
   the main transmission having two rotatable input means each operably connected to a power unit for receiving rotational power, the two input means being operably connected to a rotatable output means so that the rotational speed of the output means can vary in proportion to the algebraic mean of the speeds of rotation of the two input means;
   the differential gear assembly being arranged internally of the main transmission and having rotatable input means operably connected to two differentially rotatable output means, wherein the output means of the main transmission and the input means of the differential gear assembly are operably connected;
   control means including means for receiving command input and means for determining performance parameters associated with the operation of the powertrain, wherein the performance parameters include the load on each of the two power units, the rotational speeds of each of the two input means of the main transmission, the load on each of the two output means of the differential gear assembly, and the rotational speeds of each of the two output means of the differential gear assembly;
   wherein the control means provides closed loop feedback control to continuously monitor, analyse and adjust the performance parameters in response to command input.

2. A vehicle powertrain as claimed in claim 1 wherein the two power units comprise any similar or dissimilar combination of any of the range of internal combustion engine types or electric motors.

3. A vehicle powertrain as claimed in claim 2 wherein the two power units are selected from the group comprising Otto cycle engines, diesel engines, rotary engines, and gas turbine engines.

4. A vehicle powertrain as claimed in claim 1 wherein the two power units are arranged such that their rotational power output means are coaxially aligned in end to end relationship.

5. A vehicle powertrain as claimed in claim 4 wherein the rotational power output means of the two power units rotate in the same direction.

6. A vehicle powertrain as claimed in claim 1 wherein one of said power units comprises a constant speed electric motor and the other power unit comprises a variable speed engine.

7. A vehicle powertrain as claimed in claim 1 wherein one power unit provides a substantially constant input and the other power unit is used to provide for peak power demands and/or braking.

8. A vehicle powertrain as claimed in claim 1 wherein at least one of the rotational power output means for the two power units is selectively operable connected to one of the input means of the main transmission of the power transmission unit by clutch means.

9. A vehicle powertrain as claimed in claim 1 wherein the power units comprise Otto engines or Diesel engines and the power transmission unit is located centrally beneath the two power units.

10. A vehicle powertrain as claimed in claim 1 wherein the power units comprise rotary, gas turbine or electric engines and the power transmission unit is mounted centrally between the two power units with the power output members extending through the centre of hollow rotor or turbine shafts.

11. A vehicle powertrain as claimed in claim 10 wherein the power units are hollowed shafted pancake rotary engines or gas turbines.

12. A vehicle powertrain as claimed in claim 10 wherein the housing of the power transmission unit is integral with a common casing of the two power units.

13. A vehicle powertrain as claimed in claim 1 wherein the two power units comprise at least one internal combustion piston engine and the performance parameters continuously controlled by the control means further include performance parameters specific to each said piston engine.

14. A vehicle powertrain as claimed in claim 13 wherein the performance parameters specific to each internal combustion piston engine are chosen from the group comprising manifold boost pressure, engine torque, engine RPM, fuel mixture, spark timing, valve timing, variable intake manifold geometry, combustion chamber conditions, compression ratio and exhaust gas chemistry.

15. A vehicle powertrain as claimed in claim 1 wherein the two power units are formed by an internal combustion engine having two separated power output shafts and sharing at least some auxiliary components.

16. A vehicle powertrain as claimed in claim 1 wherein at east one of the two power units is an internal combustion engine having a variable displacement combustion chamber and/or pre-combustion chambers.

17. A vehicle powertrain as claimed in claim 10 wherein the main transmission of the power transmission unit comprises a gear train.

18. A vehicle powertrain as claimed in claim 17 wherein the two input means of the main transmission comprise a first bevel gear and an epicyclic gear assembly coaxially arranged to rotate about a first axis.

19. A vehicle powertrain as claimed in claim 18 wherein the epicyclic gear assembly comprises an annular pinion carrier that rotatably supports internally arranged epicyclic bevel pinion gears having axes perpendicular to the first axis.

20. A vehicle powertrain as claimed in claim 19 wherein the first bevel gear and the annular pinion carrier are each individually operably connectable to the two power units.

21. A vehicle powertrain as claimed in claim 17 wherein the output means of the main transmission comprises a second bevel gear to rotate about the first axis.

22. A vehicle powertrain as claimed in claim 21 wherein the output means of the differential gear assembly comprise two differential bevel side gears coaxially arranged in mesh with the differential pinion gears to rotate about the first axis.

23. A vehicle powertrain as claimed in claim 22 wherein the first and second bevel gears of the main transmission each have a centrally formed and axially extending hole and the two differential side gears of the differential gear assembly are centrally mounted on opposed ends of two coaxially aligned power output members that extend axially outwards through the holes in the first and second bevel gears of the main transmission.

24. A vehicle powertrain as claim in claim 22 wherein the main transmission is operably connected to the differential gear assembly by a differential frame that is connected to the second bevel gear of the main transmission and which carries the differential pinion gears of the differential gear assembly.

25. A vehicle power transmission unit including an outer main transmission and an inner differential gear assembly, the main transmission having two rotatable input means operably connected to a rotatable output means so that the rotational speed of the output means can vary in proportion to the algebraic means of the speeds of rotation of two input means, the differential gear assembly being entirely contained within the main transmission and having rotatable input means operably connected to two differentially rotatable output means, wherein the output means of the main transmission and the input means of the differential gear assembly are operably connected.

26. A vehicle power transmission unit as claimed in claim 25 wherein the two input means of the main transmission comprise a first bevel gear and an epicyclic gear assembly coaxially arranged to rotate about a first axis.

27. A vehicle power transmission unit as claimed in claim 26 wherein the epicyclic gear assembly comprises an annular pinion carrier that rotatably supports internally arranged epicyclic bevel pinion gears having axes perpendicular to the first axis.

28. A vehicle power transmission unit as claimed in claim 27 wherein the first bevel gear and the annular pinion carrier are each individually operably connectable to the two power units.

29. A vehicle power transmission unit as claimed in claim 26 wherein the output means of the main transmission comprises a second bevel gear to rotate about the first axis.

30. A vehicle power transmission unit as claimed in claim 29 wherein the output means of the differential gear assembly comprise two differential bevel side gears coaxially arranged in mesh with differential pinion gears to rotate about the first axis.

31. A vehicle power transmission unit as claimed in claim 30 wherein the first and second bevel gears of the main transmission each have a centrally formed and axially extending hole and the two differential side gears of the differential gear assembly are centrally mounted on opposed ends of two coaxially aligned power output members that extend axially outwards through the holes in the first and second bevel gears of the main transmission.

32. A vehicle power transmission unit as claimed in claim 30 wherein the main transmission is operably connected to the differential gear assembly by a differential frame that is connected to the second bevel gear of the main transmission and which carries the differential pinion gears of the differential gear assembly.

* * * * *